(12) United States Patent
Katulka

(10) Patent No.: US 6,607,232 B2
(45) Date of Patent: Aug. 19, 2003

(54) GAS SAVER AIR FOIL STABILIZER

(76) Inventor: Michael A. Katulka, 2300 SW. 154th Ave., Davie, FL (US) 33326

( * ) Notice: Subject to any disclaimer, the term of this patent is extended or adjusted under 35 U.S.C. 154(b) by 0 days.

(21) Appl. No.: 10/032,865

(22) Filed: Dec. 26, 2001

(65) Prior Publication Data
US 2003/0116991 A1 Jun. 26, 2003

(51) Int. Cl.$^7$ .............................................. B62D 25/00
(52) U.S. Cl. ................................... 296/57.1; 296/37.6
(58) Field of Search ............................. 256/57.1, 376, 256/160.18, 36, 100.07, 165, 183, 26.11, 180.1

(56) References Cited

U.S. PATENT DOCUMENTS

| | | | | | |
|---|---|---|---|---|---|
| 3,749,440 A | * | 7/1973 | Lathers | ........................ | 296/57.1 |
| 4,691,956 A | * | 9/1987 | Hodge | ........................ | 296/57.1 |
| 4,705,179 A | * | 11/1987 | Lathrum | ........................ | 212/180 |
| 4,778,213 A | * | 10/1988 | Palmer | ........................ | 296/57.1 |
| 4,787,809 A | * | 11/1988 | Zrostlik | ........................ | 414/557 |
| 4,813,842 A | * | 3/1989 | Morton | ........................ | 296/57.1 |
| 4,861,093 A | * | 8/1989 | Chapman | ........................ | 296/57.1 |
| 4,902,066 A | * | 2/1990 | Norman | ........................ | 296/57.1 |
| 4,905,780 A | * | 3/1990 | Goff, III | ........................ | 177/136 |
| 4,944,546 A | * | 7/1990 | Keller | ........................ | 296/61 |
| 5,069,498 A | * | 12/1991 | Benchoff | ........................ | 296/37.6 |
| 5,236,242 A | * | 8/1993 | Seeman | ........................ | 296/57.1 |
| 5,419,672 A | * | 5/1995 | Poe | ........................ | 414/462 |
| 5,427,425 A | * | 6/1995 | Droesch | ........................ | 296/57.1 |
| 5,449,212 A | * | 9/1995 | Seifert | ........................ | 296/57.1 |
| 5,468,037 A | * | 11/1995 | Peterson et al. | ........................ | 296/57.1 |
| 5,498,049 A | * | 3/1996 | Schlachter | ........................ | 296/37.6 |
| 5,669,654 A | * | 9/1997 | Eilers et al. | ........................ | 296/57.1 |
| 5,707,095 A | * | 1/1998 | Pribak et al. | ........................ | 296/57.1 |
| 5,788,311 A | * | 8/1998 | Tibbals | ........................ | 296/26.11 |
| 5,816,638 A | * | 10/1998 | Pool, III | ........................ | 296/57.1 |
| 5,826,932 A | * | 10/1998 | DeSimone | ........................ | 296/57.1 |
| 5,857,724 A | * | 1/1999 | Jarman | ........................ | 296/57.1 |
| 6,126,223 A | * | 10/2000 | Rayburn | ........................ | 296/57.1 |
| 2001/0024046 A1 | * | 9/2001 | Mizuta | ........................ | 296/57.1 |
| 2002/0096903 A1 | * | 7/2002 | Renke | ........................ | 296/57.1 |

* cited by examiner

*Primary Examiner*—Kiran Patel
(74) *Attorney, Agent, or Firm*—Frank L. Kubler

(57) ABSTRACT

A gate supporting assembly for a truck bed having a bed bottom wall, a bed wall and a bed gate, the bed gate being pivotally secured to the bed to pivot upwardly to close the bed and to pivot downwardly to become substantially horizontal and thereby open the bed, includes a gate supporting mechanism releasibly supporting the gate at an angle substantially midway between horizontal and vertical, to retain cargo while minimizing drag, increasing fuel efficiency, providing air foil traction enhancement while leaving the rear bumper exposed and functional.

12 Claims, 3 Drawing Sheets

GAS SAVER AIR FOIL STABILIZER

BACKGROUND OF THE INVENTION

1. Field of the Invention

The present invention relates generally to the field of automobile and truck accessories. More specifically the present invention relates to a gate supporting assembly for use in combination with a truck bed behind a cab of a truck, the truck bed having a gate, the gate supporting assembly holding the gate in a partially raised position to retain cargo while minimizing drag, increasing fuel efficiency, providing air foil traction enhancement while leaving the rear bumper exposed and functional. The gate supporting assembly includes a first cable fastened to cable connectors which engage the bed and gate to hold the gate in the partially raised position when at full extension and preferably includes a conventional second cable fastened to cable connectors which engage the bed and gate to hold the gate in a substantially horizontal position, the second cable preferably being connected to the first cable.

2. Description of the Prior Art

There have long been connecting members in the form of linkages and cables interconnecting truck bed side walls and lateral ends of bed gates for supporting the gate in an open, horizontal position. These connecting linkages and cables, sometimes referred to as tail gate lift cables, have served their intended purposes well, but have failed to adequately meet a several important needs of many truck owners.

The purpose of these prior connecting members is to support the gate in an open position during loading and unloading of the bed. Yet many truck owners have discovered that closed gates trap wind and create substantial drag when the truck is moving, greatly reducing fuel efficiency. As a result, many truck owners drive with their gates in the open position to eliminate this drag, but at the same time risk loss of any cargo in the bed and risk substantial liability during rear end accidents in which the open gate rides over the hood of a closed vehicle and into a vehicle occupant or into the chest of a motorcyclist sliding into the rear of the truck.

What is needed is a gate supporting assembly for positioning the gate in a position which angles back from vertical to minimize wind drag, and yet at the same time angles upwardly from horizontal to retain bed cargo and to better expose the rear truck bumper to receive direct impact.

It is thus an object of the present invention to provide a gate supporting assembly which interconnects a truck bed side wall and a pivoting bed gate to position the gate at an angle between horizontal and vertical and thus which permits the gate to retain bed cargo.

It is another object of the present invention to provide such a gate supporting assembly which lowers the gate sufficiently to substantially reduce wind drag when the truck is moving.

It is still another object of the present invention to provide such a gate supporting assembly which exposes the rear truck bumper for contact during a collision.

It is finally an object of the present invention to provide such a gate supporting assembly which deflects passing wind when the truck is moving in such a way that the wind creates a downward force at the rear of the truck to increase rear wheel traction.

SUMMARY OF THE INVENTION

The present invention accomplishes the above-stated objectives, as well as others, as may be determined by a fair reading and interpretation of the entire specification.

A gate supporting assembly is provided for supporting a gate of a truck bed, where the truck bed includes a bed bottom wall, bottom wall lateral ends, a bottom wall forward end and a bottom wall rearward end; two opposing and spaced apart bed side walls extending upwardly from and substantially along the bottom wall lateral ends, at least one bed side wall having a side wall rearward end with a bed connector; the bed gate being pivotally secured to the bed at the bottom wall rearward end to pivot upwardly to meet the bed side walls and thereby close the bed and to pivot downwardly to become substantially horizontal and contiguous with the bed bottom wall and thereby open the bed, the gate having two opposing gate lateral ends, at least one gate lateral end having a gate connector, the gate supporting assembly including a first cable; a primary cable connector fastened to the first cable for connecting to the bed connector; a secondary cable connector fastened to the first cable and spaced apart from the primary cable connector for connecting to the gate connector; where the spacing between the primary and secondary cable connectors is such that, when the first cable is at full extension, the gate is oriented at an angle substantially midway between horizontal and vertical.

The gate supporting assembly preferably additionally comprising a second cable fastened to the primary cable connector for connecting to one of the bed connectors; a tertiary cable connector fastened to the second cable and spaced apart from the primary cable connector for connecting to the bed connector; where the spacing between the primary and tertiary cable connectors is such that, when the second cable is at full extension, the gate is substantially horizontal. The gate supporting assembly preferably further includes a cable retaining structure including a cable retaining band encircling the first cable and the second cable a distance from the primary cable connector, so that the first and second cables are retained in close proximity to each other.

The primary connector preferably includes a fastener plate having a plate fastener bore; a fastener having a fastener shank rotatably passing through the plate fastener bore and having shank ends, the fastener having a fastener head extending radially from a shank end abutting the fastener plate around the fastener bore; a plate stem portion extending radially from the fastener plate; and a cable anchor including a sheet of metal wrapped around and compressed against the plate stem portion and the first cable and the second cable creating a friction grip retaining the first cable and the second cable and the plate stem portion. Each of the secondary and tertiary cable connectors preferably include a connector loop having a loop narrower end and a loop wider end extending rearwardly of the loop narrower end; a leaf retainer spring extending radially into the loop wider end; a loop stem portion extending from the connector loop; and a cable anchor including a sheet of metal is wrapped around and compressed against the loop stem portion and the first or second cable to create a friction grip retaining the given cable and the loop stem.

A gate supporting assembly is further provided for supporting a gate of a truck bed, where the truck bed includes a bed bottom wall, bottom wall lateral ends, a bottom wall forward end and a bottom wall rearward end; two opposing and spaced apart bed side walls extending upwardly from and substantially along the bottom wall lateral ends, at least one bed side wall having a side wall rearward end with a bed connector; the bed gate being pivotally secured to the bed at the bottom wall rearward end to pivot upwardly to meet the bed side walls and thereby close the bed and to pivot downwardly to become substantially horizontal and contiguous with the bed bottom wall and thereby open the bed, the gate having two opposing gate lateral ends, at least one gate lateral end having a gate connector, the gate supporting assembly including a first interconnection structure; a primary interconnection structure connector fastened to the first interconnection structure for connecting to the bed connector; a secondary interconnection structure connector fastened to the first interconnection structure and spaced apart from the primary interconnection structure connector for connecting to the gate connector; where the spacing between the primary and second interconnection structure connectors is such that, when the first interconnection structure is at full extension, the gate is oriented at an angle substantially midway between horizontal and vertical.

The gate supporting assembly preferably additionally including and including a second interconnection structure fastened to the primary interconnection structure connector for connecting to one of the bed connectors; a tertiary interconnection structure connector fastened to the second interconnection structure and spaced apart from the primary interconnection structure connector for connecting to the bed connector; where the spacing between the primary and tertiary interconnection structure connectors is such that, when the second interconnection structure is at full extension, the gate is substantially horizontal.

A truck, including a truck bed having a bed bottom wall, a bed wall and a bed gate, the bed gate being pivotally secured to the bed to pivot upwardly to close the bed and to pivot downwardly to become substantially horizontal and thereby open the bed; a gate supporting assembly including a gate supporting mechanism releasibly supporting the gate at an angle substantially midway between horizontal and vertical.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
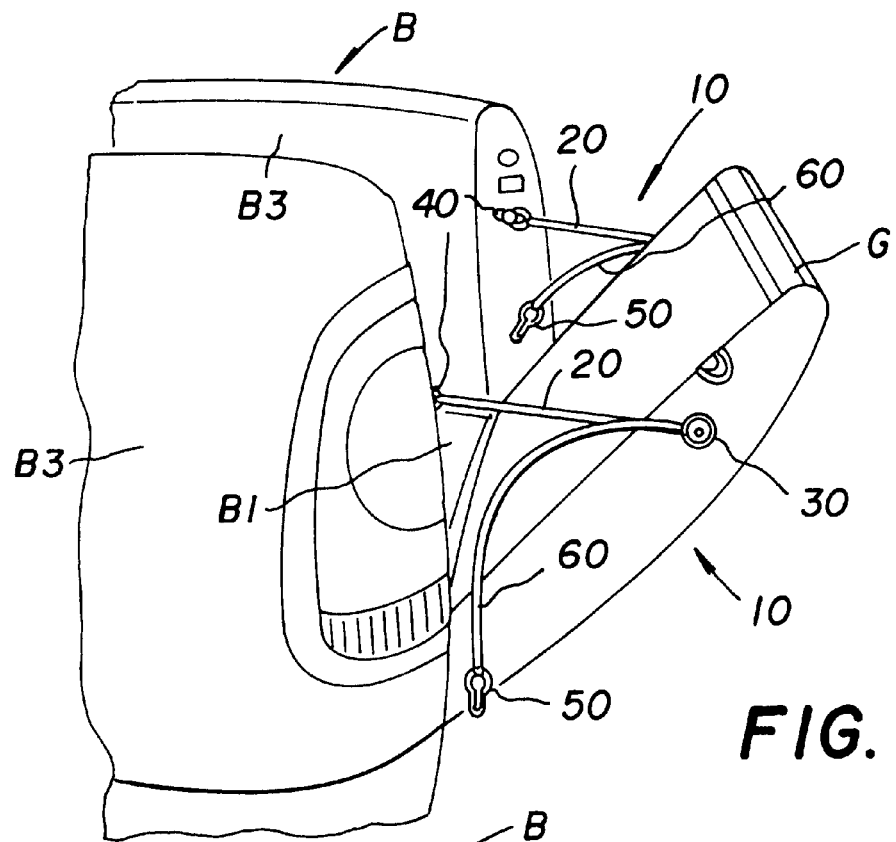
FIG. 1 is a broken away perspective side view of the rear of a truck bed, showing the gate secured in the inventive, partially open/partially closed position using the preferred embodiment of the gate supporting assembly.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
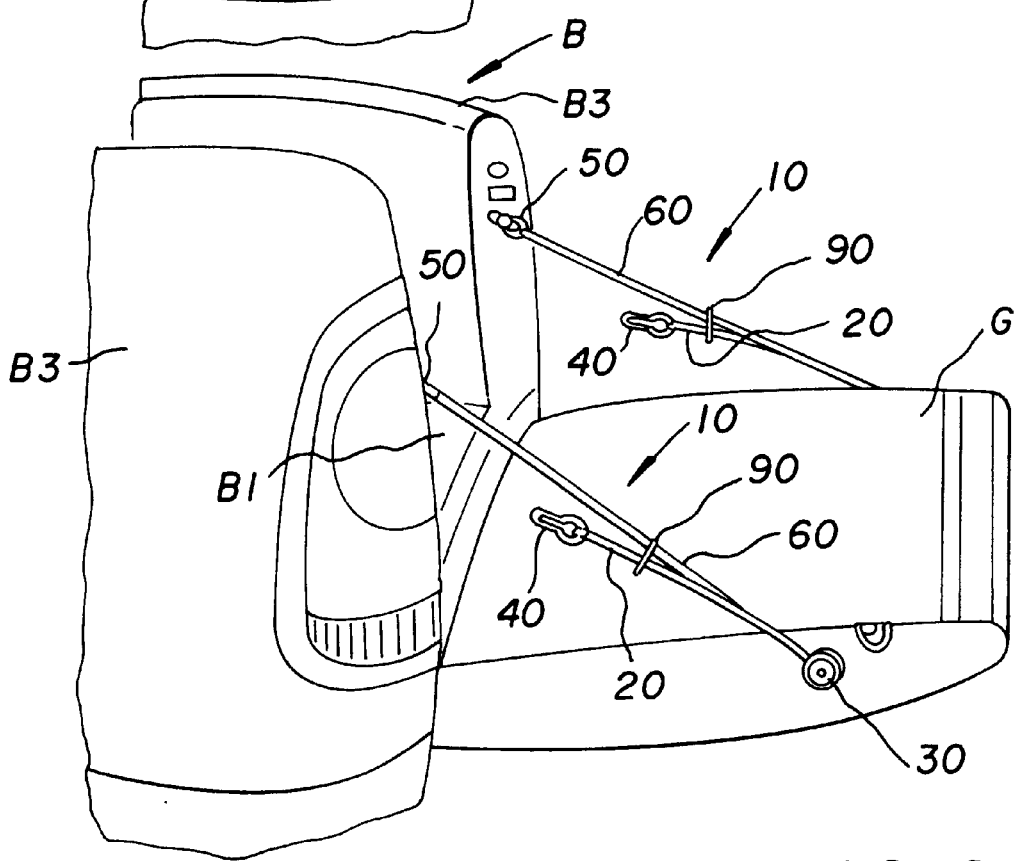
FIG. 2 is a broken away perspective side view of the rear of a truck bed, showing the gate secured in the conventional, generally horizontal, open position using an optional feature of the preferred embodiment.
Figure 5:
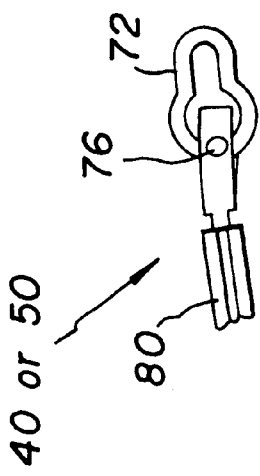
FIG. 5 is a side view of the preferred secondary or tertiary cable connector.
Figure 4:
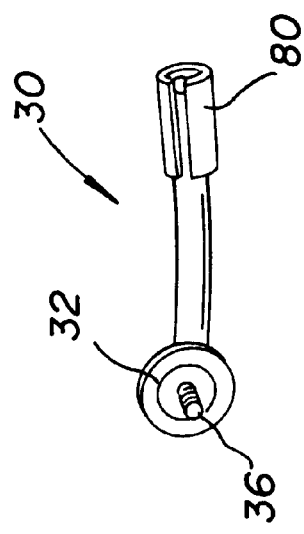
FIG. 4 is a side view of the preferred primary cable connector.
Figure 3:
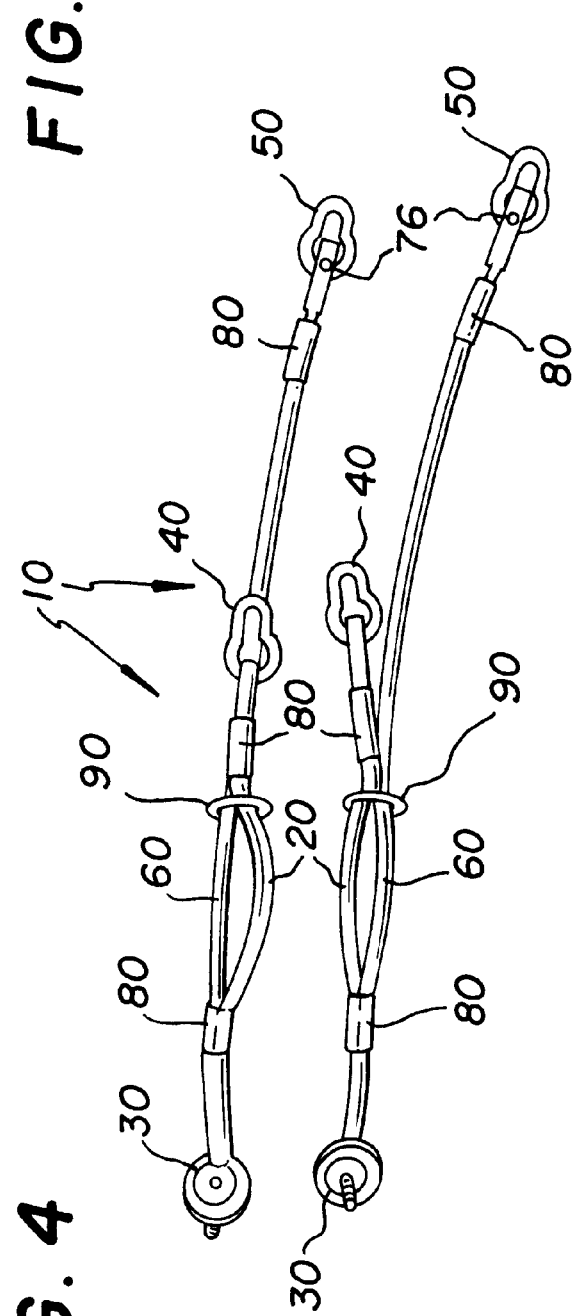
FIG. 3 is a side view of left and right hand versions of the gate supporting assembly.
Figure 6:
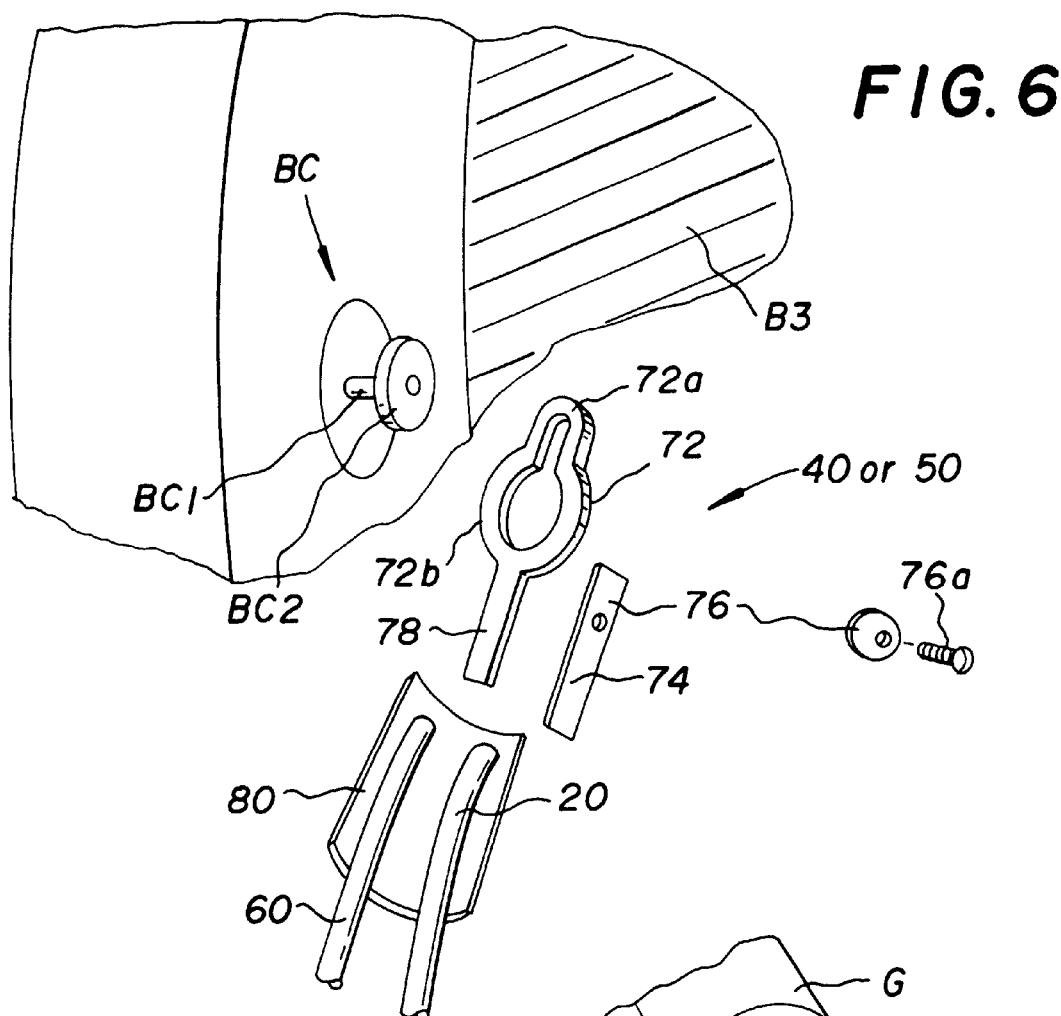
FIG. 6 is a broken away partial view of a truck bed side wall and bed connector, and of a preferred secondary or tertiary cable connector disassembled to reveal its various elements.
Figure 7:
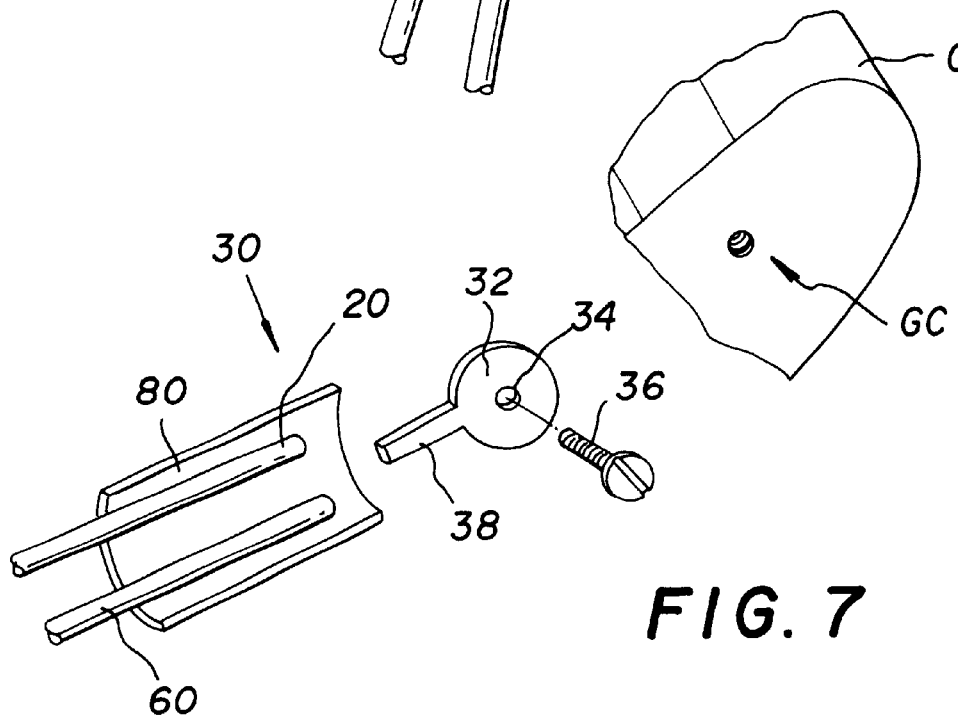
FIG. 7 is broken away partial view of a bed gate and gate connector, and of a preferred primary cable connector disassembled to reveal its various elements.

Referring to FIGS. 1–7, a gate supporting assembly 10 is disclosed for use in combination with a truck bed B behind a cab of a truck, the truck bed B having agate G, for holding the gate G in a partially raised position to retain cargo while minimizing drag, increasing fuel efficiency, and providing air foil enhancement of rear truck tire traction while leaving the truck rear bumper exposed and functional.

The truck bed B is understood to include a bed bottom wall B1, a bed forward wall (not shown) defined by the rear surface of the cab, bottom wall lateral ends, a bottom wall forward end and a bottom wall rearward end; two opposing and spaced apart bed side walls B3 extending upwardly from and substantially along the bottom wall lateral ends, each bed side wall B3 having a side wall rearward end with a bed connector BC; and the bed gate G pivotally secured to the bed B at the bottom wall B1 rearward end to pivot upwardly to meet the bed side walls B3 and thereby close the bed B and to pivot downwardly to become substantially horizontal and contiguous with the bed bottom wall B1 and thereby open the bed B, the gate G having two opposing gate lateral ends, each gate lateral end having a gate connector GC. See FIGS. 1 and 2.

The gate supporting assembly 10 preferably includes a first cable 20 fastened to a primary cable connector 30 for connecting to one of the bed connectors BC and fastened to a secondary cable connector 40 for connecting to one of the gate connectors GC, the spacing between the primary cable connector 30 and the secondary cable connector 50 being such that the when the first cable 20 is at full extension the gate G is oriented at an angle substantially midway between horizontal and vertical, preferably at 40 to 45 degrees from horizontal. See FIGS. 3, 1 and 2. The assembly 10 preferably additionally includes a second cable 60 fastened to the primary cable connector 30, once again for connecting to one of the bed connectors BC, and fastened to a tertiary cable connector 50 for connecting to one of the bed connectors BC, the spacing between the primary cable connector 30 and the tertiary cable connector 50 being such that the when the second cable 60 is at full extension the gate G is substantially horizontal. Left side and right side versions of gate supporting assembly 10 preferably are provided which are essentially mirror images of each other. A version of gate supporting assembly 10 having linkages in place of cables 20 and 60 is contemplated.

A cable retaining means 90 in the form of a cable retaining band preferably is provided and encircles first and second cables 20 and 60, respectively, a distance from primary cable connector 30. See FIG. 3. As a result, when one cable 20 or 60 is in use at a given moment the cable 60 or 20 not in use is retained against lateral movement in close proximity to the cable 20 or 60 in use so that the cable not in use does not fall between a bed side wall B3 and the gate G and obstruct the gate G pivoting movement.

The primary cable connector 30 preferably is of well known construction and connects to a gate connector GC, the primary cable connector 30 including a fastener plate 32 having a plate fastener bore 34 and a fastener 36 having a fastener shank rotatably passing through the plate fastener bore 34 and having shank ends, the fastener 36 having a fastener head extending radially from a shank end which abuts the fastener plate 32 around the fastener bore 34. See FIGS. 3, 4 and 7. A plate stem portion 38 preferably extends radially from the fastener plate 32, and a cable anchor 80 in the form of a sheet of metal is wrapped around and compressed against the plate stem portion 38 and the first and second cables 20 and 60 to an extent that an extremely high friction grip is created which retains the cables 20 and 60 and the plate stem portion 38 when either cable is in tension supporting the bed gate G.

The bed connector BC preferably is of well known construction, including a cylindrical bed connector shank BC1 protruding laterally from the rearward end of each bed side wall B3 toward the opposing bed side wall B3. See FIG. 6. The shank BC1 has a bed connector head BC2 spaced apart from the bed side wall B3 to which the shank BC1 is attached and extending radially outward from the bed connector shank BC1, and has a bed side wall connection structure BC3. The bed side wall connection structure BC3 preferably includes a connection plate with a plate fastener hole and a plate fastener, which preferably is a machine screw.

Each of the secondary and tertiary cable connectors 40 and 50, respectively, preferably is also of well known construction, including a metal or plastic connector loop 72 having a loop narrower end 72*a* sized to pass the bed connector shank BC1 but not to pass the bed connector head BC2, and a loop wider end 72*b* extending rearwardly. of the loop narrower end 72*a* and sized to pass the bed connector head BC2, so that the bed connector head BC2 can be passed through the loop wider end 72*b*, and then the connector loop 72 can be slid rearwardly so that the loop narrower end 72*a* fits around the connector shank BC1 so that the connector loop 72 cannot slide over the connector head BC2 and off the bed connector BC. See FIGS. 5 and 6. A leaf retainer spring 74 preferably extends radially into the loop wider end 72*b* to abut a bed connector head BC2 and thus prevent the bed connector head BC2 from fully entering the loop wider end 72*b* unless the leaf retaining spring 74 is manually deflected. A loop stem portion 78 preferably extends radially from the connector loop 72, and another cable anchor 80 is wrapped around and compressed against the loop stem portion 78 and the first or second cable 20 or 60 to an extent that an extremely high friction grip is created which retains the given cable 20 or 60 and the loop stem 78 when the cable is placed in tension supporting the bed gate G.

An inventive and important addition to conventional secondary and tertiary cable connectors 40 and 50 is a spring gripping knob 76 fastened to the leaf retainer spring 74 toward but spaced apart from the leaf spring 74 free end. Since leaf retainer spring 74 must be manually deflected to release cable connectors 40 and 50 from a bed connector BC so that the user can switch from use of cable 20 to cable 60 and back again, the provision of spring gripping knob 76 makes the use of gate supporting assembly 10 far more practical. A leaf spring fastener bore is provided in leaf spring 75. Spring gripping knob 76 has an knob axial bore, and a screw or pop rivet 76*a* is inserted through the knob axial bore and through the leaf spring fastener bore.

While first and second cables 20 and 60 are preferred, alternative and equivalent interconnection structures are contemplated, including chains, linkages, brackets and hydraulic pistons and cylinders. The term "interconnection structure" is understood to be a more general term for primary, secondary and tertiary cable connectors.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A gate supporting assembly for supporting a gate of a truck bed, wherein the truck bed comprises a bed bottom wall, bottom wall lateral ends, a bottom wall forward end and a bottom wall rearward end; two opposing and spaced apart bed side walls extending upwardly from and substantially along the bottom wall lateral ends, at least one bed side wall having a side wall rearward end with a bed connector; the bed gate being pivotally secured to the bed at the bottom wall rearward end to pivot upwardly to meet the bed side walls and thereby close the bed and to pivot downwardly to become substantially horizontal and contiguous with the bed bottom wall and thereby open the bed, the gate having two opposing gate lateral ends, at least one gate lateral end having a gate connector, the gate supporting assembly comprising:

a first cable;

a primary cable connector fastened to said first cable for connecting to the bed connector;

a secondary cable connector fastened to said first cable and spaced apart from said primary cable connector for connecting to the gate connector;

wherein the spacing between the primary and secondary cable connectors is such that, when said first cable is at full extension, the gate is oriented at an angle substantially midway between horizontal and vertical.

2. The gate supporting assembly of claim 1, additionally comprising:

a second cable fastened to said primary cable connector for connecting to one of the bed connectors;

and a tertiary cable connector fastened to said second cable and spaced apart from said primary cable connector for connecting to the bed connector;

wherein the spacing between the primary and tertiary cable connectors is such that, when said second cable is at full extension, the gate is substantially horizontal.

3. The gate supporting assembly of claim 2, additionally comprising a cable retaining means comprising a cable retaining band encircling said first cable and said second cable a distance from said primary cable connector, such that said first and second cables are retained in close proximity to each other.

4. The gate supporting assembly of claim 1, wherein said primary connector comprises:

a fastener plate having a plate fastener bore;

a fastener having a fastener shank rotatably passing through said plate fastener bore and having shank ends, said fastener having a fastener head extending radially from a shank end abutting said fastener plate around said fastener bore;

a plate stem portion extending radially from said fastener plate, and a cable anchor comprising a sheet of metal wrapped around and compressed against said plate stem portion and said first cable and said second cable creating a friction grip retaining said first cable and said second cable and said plate stem portion.

5. The gate supporting assembly of claim 1, wherein each of said secondary and tertiary cable connectors comprise:
   a connector loop having a loop narrower end and a loop wider end extending rearwardly of said loop narrower end;
   a leaf retainer spring extending radially into said loop wider end;
   a loop stem portion extending from the connector loop;
   and a cable anchor comprising a sheet of metal is wrapped around and compressed against said loop stem portion and said first or second cable to create a friction grip retaining the given said cable and said loop stem.

6. The gate supporting assembly of claim 5, additionally comprising a spring gripping knob secured to said leaf retaining spring for manual gripping by a user to deflect said leaf retaining spring.

7. A gate supporting assembly for supporting a gate of a truck bed, wherein the truck bed comprises a bed bottom wall, bottom wall lateral ends, a bottom wall forward end and a bottom wall rearward end; two opposing and spaced apart bed side walls extending upwardly from and substantially along the bottom wall lateral ends, at least one bed side wall having a side wall rearward end with a bed connector; the bed gate being pivotally secured to the bed at the bottom wall rearward end to pivot upwardly to meet the bed side walls and thereby close the bed and to pivot downwardly to become substantially horizontal and contiguous with the bed bottom wall and thereby open the bed, the gate having two opposing gate lateral ends, at least one gate lateral end having a gate connector, the gate supporting assembly comprising:
   a first interconnection structure;
   a primary interconnection structure connector fastened to said first interconnection structure for connecting to the bed connector;
   a second interconnection structure fastened to said primary interconnection structure connector for connecting to one of the bed connectors;
   wherein the spacing between the primary and second interconnection structure connectors is such that, when said first interconnection structure is at full extension, the gate is oriented at an angle substantially midway between horizontal and vertical.

8. The gate supporting assembly of claim 7, additionally comprising:
   a secondary interconnection structure connector fastened to said first interconnection structure and spaced apart from said primary interconnection structure connector for connecting to the gate connector;
   a tertiary interconnection structure connector fastened to said second interconnection structure and spaced apart from said primary interconnection structure connector for connecting to the bed connector; wherein the spacing between the primary and tertiary interconnection structure connectors is such that, when said second interconnection structure is at full extension, the gate is substantially horizontal.

9. A gate supporting assembly for supporting a gate of a truck bed, wherein the truck bed comprises a bed bottom wall, bottom wall lateral ends, a bottom wall forward end and a bottom wall rearward end; two opposing and spaced apart bed side walls extending upwardly from and substantially along the bottom wall lateral ends, at least one bed side wall having a side wall rearward end with a bed connector; the bed gate being pivotally secured to the bed at the bottom wall rearward end to pivot upwardly to meet the bed side walls and thereby close the bed and to pivot downwardly to become substantially horizontal and contiguous with the bed bottom wall and thereby open the bed, the gate having two opposing gate lateral ends, at least one gate lateral end having a gate connector, the gate supporting assembly comprising:
   a flexible member;
   a primary flexible member connector fastened to said flexible member for connecting to the bed connector;
   a secondary flexible member connector fastened to said flexible member and spaced apart from said primary flexible member connector for connecting to the gate connector;
   wherein the spacing between said primary flexible member connector and said secondary flexible member connector is such that, when said primary flexible member connector is connected to the bed connector and said secondary flexible member connector is connected to the gate connector and said flexible member is at full extension, and when the bed is substantially horizontal, the gate is oriented at an angle substantially midway between horizontal and vertical.

10. A truck bed with bed gate supporting assembly, comprising:
    a truck bed comprising a bed bottom wall extending substantially within a bed bottom wall plane, bottom wall lateral ends, a bottom wall forward end and a bottom wall rearward end; two opposing and spaced apart bed side walls extending upwardly from and substantially along the bottom wall lateral ends, at least one bed side wall having a side wall rearward end with a bed connector; the bed gate being pivotally secured to the bed at the bottom wall rearward end to pivot upwardly to meet the bed side walls and thereby close the bed and to pivot downwardly to become substantially horizontal and contiguous with the bed bottom wall and thereby open the bed, the gate having two opposing gate lateral ends, at least one gate lateral end having a gate connector;
    a bed gate supporting assembly comprising a flexible member; a primary flexible member connector fastened to said flexible member and connected to said bed connector; a secondary flexible member connector fastened to said flexible member and spaced apart from said primary flexible member connector and connected to said gate connector; wherein the spacing between said primary flexible member connector and said secondary flexible member connector is such that, when said primary flexible member connector is connected to said bed connector and said secondary flexible member connector is connected to said gate connector and said flexible member is at full extension, and when said bed is substantially horizontal, said gate is oriented at an angle substantially midway between horizontal and vertical.

11. A truck bed with bed gate supporting assembly, comprising:
    a truck bed comprising a bed bottom wall extending substantially within a bed bottom wall plane, bottom wall lateral ends, a bottom wall forward end and a bottom wall rearward end; two opposing and spaced apart bed side walls extending upwardly from and substantially along the bottom wall lateral ends, at least one bed side wall having a side wall rearward end with a bed connector; the bed gate being pivotally secured to the bed at the bottom wall rearward end to pivot upwardly to meet the bed side walls and thereby close the bed and to pivot downwardly to become substantially horizontal and contiguous with the bed bottom wall and thereby open the bed, the gate having two opposing gate lateral ends, at least one gate lateral end having a gate connector with a gate connector threaded bore;

a bed gate supporting assembly comprising a flexible member; a primary flexible member connector fastened to said flexible member and connected to said bed connector, said primary flexible member connector comprising a connector loop engaging said bed connector; a secondary flexible member connector fastened to said flexible member and spaced apart from said primary flexible member connector and connected to said gate connector, said secondary flexible member connector comprising a fastener retaining structure and a threaded fastener having a threaded fastener shank rotatably retained by said fastener retaining structure engaging said gate connector; wherein the spacing between said primary flexible member connector and said secondary flexible member connector is such that, when said primary flexible member connector is connected to said bed connector and said secondary flexible member connector is connected to said gate connector and said flexible member is at full extension, and when said bed is substantially horizontal, said gate is oriented at an angle substantially in a middle range between horizontal and vertical.

12. A truck bed with bed gate supporting assembly, comprising:

a truck bed comprising a bed bottom wall, bottom wall lateral ends, a bottom wall forward end and a bottom wall rearward end; two opposing and spaced apart bed side walls extending upwardly from and substantially along the bottom wall lateral ends, at least one bed side wall having a side wall rearward end with a bed connector; the bed gate being pivotally secured to the bed at the bottom wall rearward end to pivot upwardly to meet the bed side walls and thereby close the bed and to pivot downwardly to become substantially horizontal and contiguous with the bed bottom wall and thereby open the bed, the gate having two opposing gate lateral ends, at least one gate lateral end having a gate connector;

a bed gate supporting assembly comprising an interconnection member; a primary interconnection member connector fastened to said interconnection member and connected to said bed connector; a secondary interconnection member connector fastened to said interconnection member and spaced apart from said primary interconnection member connector and connected to said gate connector; wherein the spacing between said primary interconnection member connector and said secondary interconnection member connector is such that, when said primary interconnection member connector is connected to said bed connector and said secondary interconnection member connector is connected to said gate connector and said interconnection member is at full extension, and when said bed is substantially horizontal, said gate is oriented at an angle substantially in a middle range between horizontal and vertical.

* * * * *